No. 714,872.  
J. T. CYR.  
CLUTCH MECHANISM.  
(Application filed July 12, 1902.)  
Patented Dec. 2, 1902.
(No Model.)
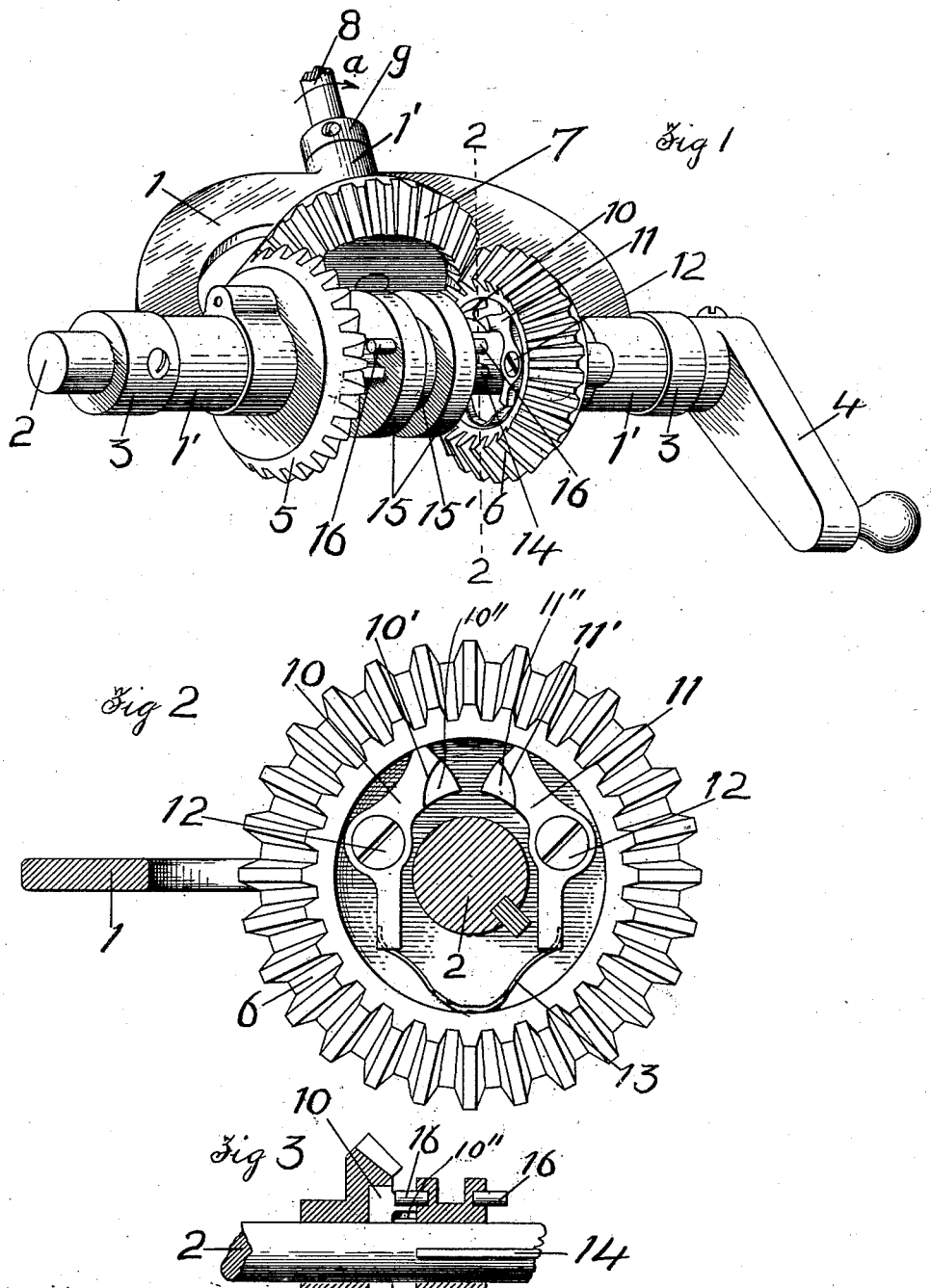

UNITED STATES PATENT OFFICE.

JOSEPH T. CYR, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

CLUTCH MECHANISM.

SPECIFICATION forming part of Letters Patent No. 714,872, dated December 2, 1902.

Application filed July 12, 1902. Serial No. 115,336. (No model.)

*To all whom it may concern:*

Be it known that I, JOSEPH T. CYR, a citizen of the United States, residing at Worcester, in the county of Worcester and State of Massachusetts, have invented certain new and useful Improvements in Clutch Mechanism, of which the following is a specification.

My invention relates to a clutch for clutching a gear or other surface, loosely mounted on a shaft, to the shaft to revolve therewith; and the object of my invention is to provide a clutch of simple construction and operation.

My invention consists in certain novel features of construction of my clutch, as will be hereinafter fully described.

I have shown in the drawings my clutch combined with two bevel-gears loosely mounted on a driven shaft and meshing with a third bevel-gear fast on a shaft to communicate motion to said third bevel-gear and shaft in one direction or the other, according as the clutch is moved to engage with one or the other of the two bevel-gears loose on the driven shaft.

Referring to the drawings, Figure 1 is a perspective view of my clutch and the bevel-gears and shaft above referred to. Fig. 2 is a section on line 2 2, Fig. 1, looking in the direction of arrow $a$, same figure. The operating-handle is not shown; and Fig. 3 is a central section through the clutch and one of the gears shown in Fig. 1.

In the accompanying drawings, 1 is a frame or stand having bearings 1' for the driving-shaft 2, held in position by collars 3. In this instance a crank or handle 4 is fast on one end of the shaft 2 to revolve the same; but said shaft 2 may be driven by power.

On the shaft 2 are loosely mounted two bevel-gears 5 and 6, each of which meshes with a third bevel-gear 7, fast on a shaft 8, having a bearing 1'' on the stand 1 and having a collar 9 fast thereon. The axis of rotation of the bevel-gear 7 and shaft 8 is at right angles to the axis of rotation of the shaft 2 and the bevel-gears 5 and 6. Each of the bevel-gears 5 and 6 has its inner side or surface cored out or recessed to receive two levers or clutch-fingers 10 and 11, pivoted on studs or screws 12, secured to the gears 5 and 6. A spring 13, engaging the ends of the levers 10 and 11 upon the opposite side of the pivot-screws 12 from the clutch ends of said levers, acts to move and hold the clutch ends apart or in the position shown in Fig. 2.

Mounted on the shaft 2 and connected therewith by a spline 14 is the sliding clutch member 15, which has an annular groove or recess 15' in its periphery to receive the yoke of the shipper-lever (not shown) which moves the clutch member 15 in one direction or the other on the shaft 2, as desired.

On each outer surface or face of the clutch member 15 there is in this instance one pin or stud 16, which is adapted to ride on the curved outer face 10' or 11' on the ends of the levers 10 and 11 to move one of said levers toward the other on its pivot-support and allow the pin or stud 16 to enter into the recess 10'' or 11'' in the levers 10 and 11 and be held therein and cause either bevel-gear 5 or 6 with which the clutch is in engagement to rotate with the clutch on the driven shaft 2 and drive the bevel-gear 7 and the shaft 8 in one direction or the other, according as the clutch is in engagement with the bevel-gear 5 or the bevel-gear 6.

From the above description, in connection with the drawings, the operation of my clutch will be readily understood by those skilled in the art. If it is desired to drive the shaft 8 in the direction of arrow $a$, the clutch 15 is moved to the right, Fig. 1, and in the revolution of said clutch with the shaft 2 the pin or stud 16, no matter what the position of the bevel-gear 6, will pass over the curved surface 10' or 11' on the end of the levers 10 or 11, according to the direction of rotation of the shaft 2, and enter the recess 10'' or 11'' in the levers 10 or 11 and through the engagement of the pin or stud 16 with the shouldered portion of said recess revolve the gear 6 and through gear 7 revolve the shaft 8. If it is desired to revolve the shaft 8 in the opposite direction, the clutch 15 is moved to the left, Fig. 1, and the pin or stud 16 thereon will by engagement with the recessed portion of the levers 10 or 11, attached to said gear 5, according to the direction of the rotation of the shaft 2, rotate the gear 5 and through the gear 7 rotate the shaft 8, the other pin or stud 16 moving out of engagement with the levers 10 and 11 on the bevel-gear 5.

It will be understood that the details of construction of my clutch may be varied, if desired, and the same may be combined with and used with different arrangements of bevel or plain gears or other surfaces.

Having thus described my invention, what I claim as new, and desire to secure by Letters Patent, is—

1. A clutch, comprising one member with a pin thereon, a second member having levers pivotally mounted thereon, said pivoted levers adapted to be engaged and moved by said pin, and to hold or lock said pin to cause the two members to rotate together, substantially as shown and described.

2. In a clutch, the combination with the sliding member mounted on a driven shaft and having an engaging pin thereon, of a surface loose on the driven shaft, and having two levers pivotally mounted thereon adapted to be engaged and moved by said engaging pin, and to lock or hold said pin to clutch the loose surface to the driven shaft, substantially as shown and described.

3. A clutch, comprising one member having a pin projecting therefrom, a second member having two spring-actuated levers mounted thereon, said levers adapted to be engaged and moved by said pin and to hold or lock said pin to cause the two members to rotate together, substantially as described.

4. In a clutch, the combination with the sliding member, the shaft on which said member is splined, said member being provided with an engaging pin, a second member loose on the said shaft and having two levers pivotally mounted thereon, said pivotally-mounted levers adapted to be engaged and moved by said engaging pin to lock or hold said pin and clutch the loosely-mounted member to said shaft, and a spring for actuating said levers.

JOSEPH T. CYR.

Witnesses:
J. C. DEWEY,
M. HAAS.